W. I. SONNER.
HAY GATHERER AND STACKER.
APPLICATION FILED MAR. 6, 1918.
1,327,637.
Patented Jan. 13, 1920.
3 SHEETS—SHEET 1.
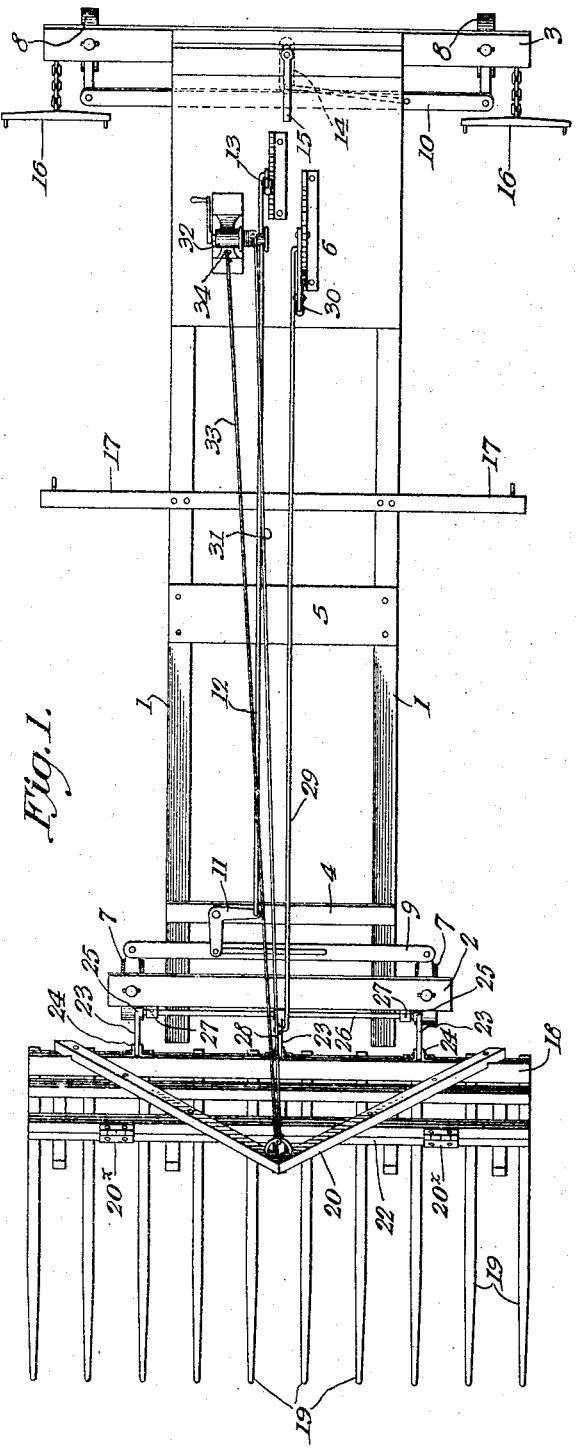
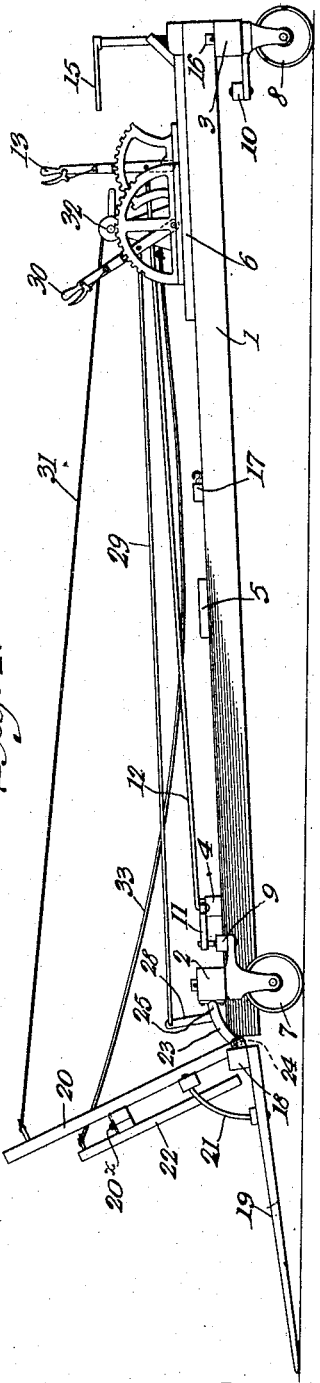
Inventor
William I. Sonner

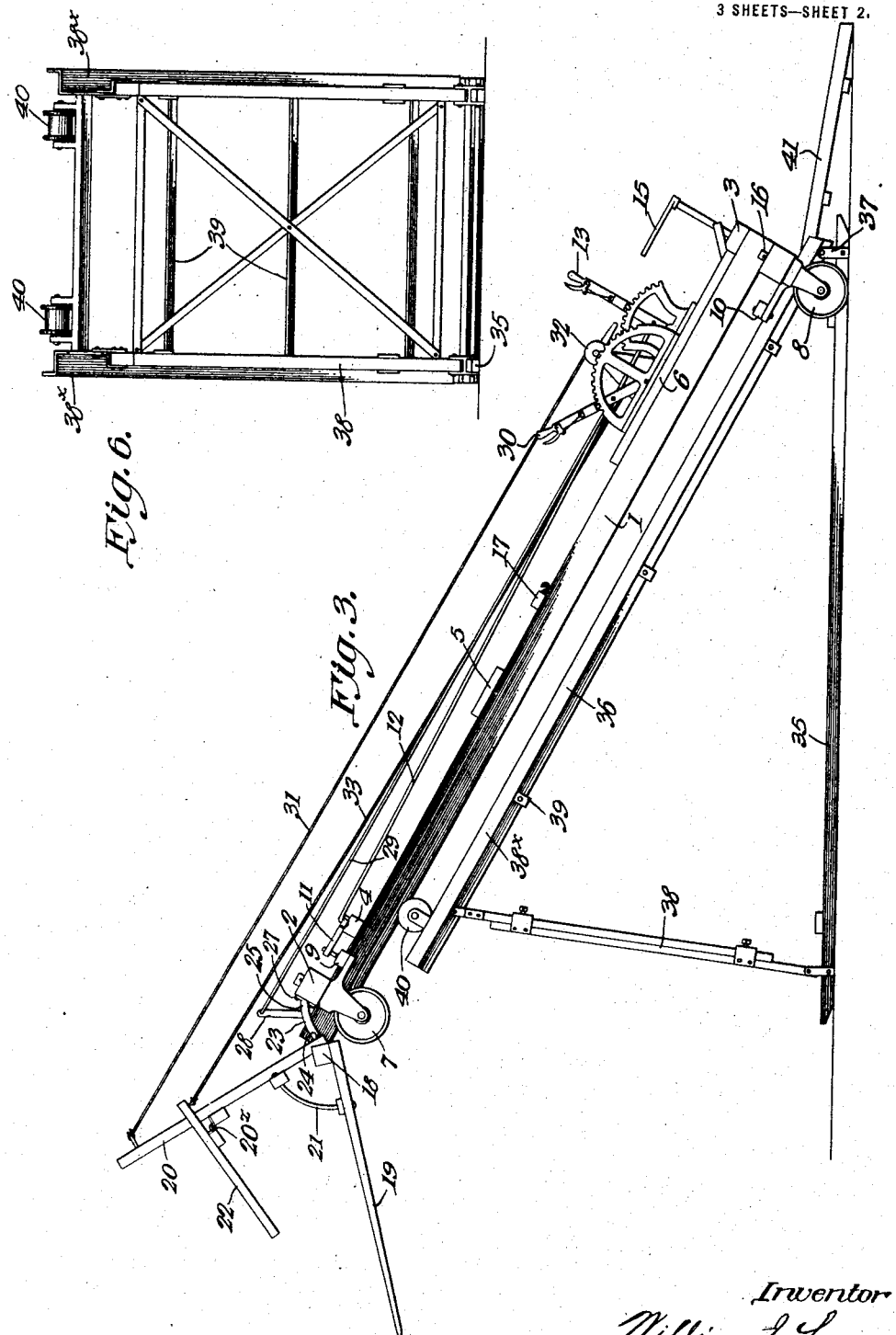

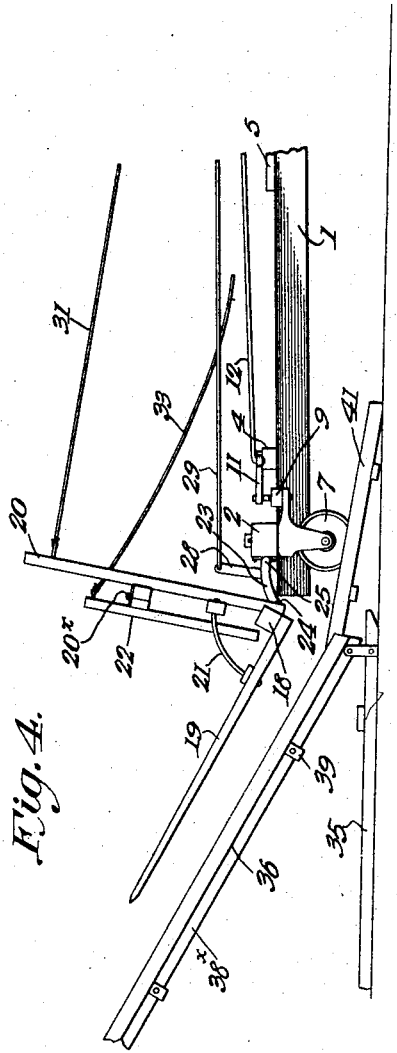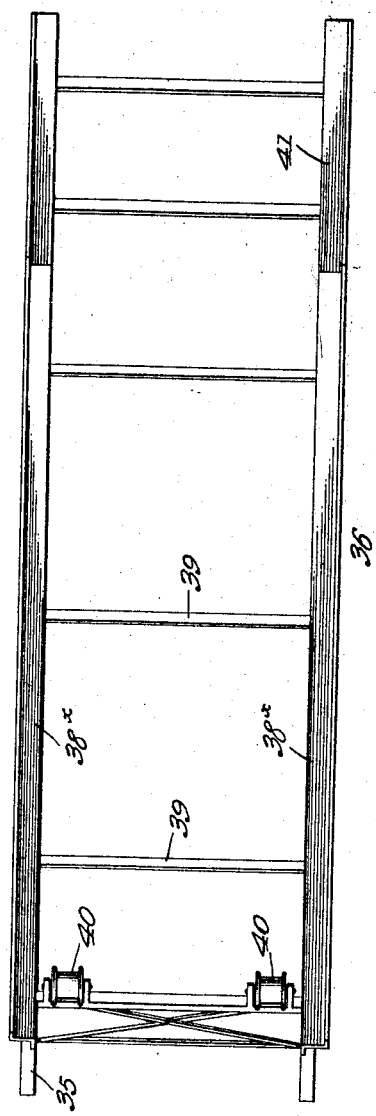

UNITED STATES PATENT OFFICE.

WILLIAM I. SONNER, OF BLAINE, IDAHO.

HAY GATHERER AND STACKER.

1,327,637.　　　　　Specification of Letters Patent.　　Patented Jan. 13, 1920.

Application filed March 6, 1918. Serial No. 220,783.

*To all whom it may concern:*

Be it known that I, WILLIAM I. SONNER, a citizen of the United States, residing at Blaine, in the county of Camas and State of Idaho, have invented a certain new and useful Improvement in Hay Gatherers and Stackers, of which the following is a full, clear, and exact description.

An object of this invention is to provide a device for gathering and stacking hay and the like, easily and rapidly, and without the use of forks for pitching the hay onto the stack from a hay rack or the like, thus obviating the necessity for much of the hand labor required in the present methods of forming stacks.

The invention consists in a vehicle provided with a rake and adapted to be drawn or propelled over a field for the purpose of collecting a load of hay or the like on the rake, and after such load is collected, of being run upon an inclined track structure by which the rake is elevated for the purpose of discharging its load; and the invention consists further in devices for adjusting the rake with relation to the ground, the vehicle and the track structure; and also in means operable in conjunction therewith for discharging the load from the rake, as I will proceed now to explain and finally claim.

In the accompanying drawings illustrating the invention, in the several figures of which like parts are similarly designated, Figure 1 is a top plan view of the vehicle with its rake and operating devices. Fig. 2 is a side elevation of the same. Fig. 3 is a side elevation of the vehicle in position upon the track structure, and showing the rake in discharging position. Fig. 4 is a fragmentary side elevation of the vehicle and the track structure showing the vehicle in the initial step of advancing upon the track structure. Fig. 5 is a top plan view of the track structure, and Fig. 6 is a front end elevation of the same.

The vehicle frame has side members 1 and front and rear bolsters 2 and 3, respectively, connected thereto, and suitable cross braces 4 and 5, and a rear platform 6. Mounted in suitable swivel bearings in the bolsters 2 and 3 are pairs of wheels 7 and 8 respectively provided with suitable steering connections 9 and 10, the front wheels 7 being steered by means of a bell-crank lever 11 connected by a link 12 with a lock-lever 13 mounted upon the platform 6 within reach of the operator, and the rear wheels 8 being steered by means of a lever 14 connected with a tiller 15 adapted to be moved from side to side by the knees of the operator. I have shown swingletrees 16 and hold-backs 17 for use when horses are the means used for moving the vehicle, but it is obvious that other devices may be substituted therefor when other means of traction are employed.

At the forward end of the vehicle frame is mounted a rake comprising a head 18 provided with teeth 19 and an upstanding member 20 supported by the head 18 and by suitable angle-braces 21. On the member 20 is pivoted, as by hinges 20$^\times$, a load discharging device 22. The rake is suitably connected to the vehicle so as to have a dual pivotal action with relation thereto as by arms 23 pivoted as at 24 to the head 18 and rigidly fastened at their inner ends 25 to an oscillating bar 26 suitably journaled in brackets 27 to the bolster 2. The bar 26 has a lever 28 connected by a link 29 with an operating lever 30 mounted on the platform 6, by which means the rake may be raised bodily with relation to the vehicle, and the upstanding member 20 is provided with a cable 31, or the like, operatively connected with a windlass 32, whereby the rake may be angularly adjusted on the pivots 24.

The load discharging device 22 is operated by means of a cable 33, or the like, attached to some stationary part of the vehicle, as at 34 on the platform, so that as the rake is dropped to the discharging position shown in Fig. 3, the discharging device will turn upon its hinges 20$^\times$ and its lower end will be thrown forward to push the load from the rake.

The track structure comprises a foundation-member 35 and a track member 36 pivoted to it at one end as at 37 and connected to it at its other end by means of an extensible frame 38 by which the angle of inclination of the track member may be adjusted.

The track member comprises a pair of tracks 38$^\times$ of wood or steel, preferably in the form of Z bars suitably braced by cross members 39, and at its upper end is a pair of grooved rollers 40 adapted to coöperate with the side members 1 of the vehicle. An approach 41 is provided to facilitate running the vehicle upon the track member.

In operation the rake is adjusted by means of the lever 30 and windlass 32, so that its teeth 19 will drag on the ground, and the vehicle is then drawn or pushed along by the horses attached to the draft appliances 16 and 17 until a load is collected upon the rake. The rake is then raised to the position shown in Fig. 4 by operating the lever 30 and windlass 32, and the vehicle is run upon the track member 36, the horses walking upon the ground at each side, until the front wheel 7 run off of the tracks and the frame of the vehicle is supported upon the rollers 40, the front end of the vehicle and the rake with its load projecting out past the upper end of the track member, as shown in Fig. 3. In this connection it will be observed that the rear wheels of the vehicle are of wider gage than the front wheels, and do not run upon the tracks, but rest upon the ground at the sides of the track member. The rake is now in position to be discharged of its load, and this is done by releasing the lever 30 and windlass 32 and allowing the rake to drop to the position shown in Fig. 3, thus causing the lower end of the discharging device to move outwardly and push the load off of the rake.

As the height of the stack being formed increases, the frame 38 may be extended to raise the forward end of the track member, and thereby elevate the vehicle correspondingly, when it is run upon the track member to discharge subsequent loads.

It is obvious that the device of the invention is adapted for use in loading wagons, storing hay in barns, and in other capacities where gathering, elevating and dumping operations are necessary.

Various changes in details of construction and arrangement of parts are contemplated as within the spirit of the invention and the scope of the following claims.

What I claim is:—

1. In a hay gatherer and stacker, a wheeled vehicle provided with a rake pivotally mounted thereon independently of its wheels, and means on the vehicle controllable by the operator for adjusting said rake with relation to said vehicle so as to accumulate a load and upon release to permit the rake to incline downwardly so as to discharge the load.

2. In a hay gatherer and stacker, a wheeled vehicle provided at its forward end with a gathering rake pivotally mounted thereon independently of its wheels, and means on said vehicle and connected with said rake and controllable by the operator for adjusting the position of the rake with relation to said vehicle so as to accumulate a load and upon release to permit the rake to incline downwardly so as to discharge the load.

3. In a hay gatherer and stacker, a wheeled vehicle having a frame, a rake pivotally mounted upon the forward end of said vehicle frame independently of its wheels and adapted to gather a load as the vehicle is moved over a field, means to lower the rake, and a load-discharging device mounted upon the rake and automatically operating to discharge the load from the rake when the rake is lowered.

4. In a hay gatherer and stacker, a wheeled vehicle having a frame, a rake pivotally mounted upon the forward end of said frame and adapted to gather a load as the vehicle is moved over a field, means on the vehicle and controllable by the operator to place the rake in position to gather the load and to lower the rake to discharge the load, and a load discharging device mounted upon the rake and automatically operating to discharge the load from the rake when the rake is lowered.

5. In a hay gatherer and stacker, a vehicle, a rake pivotally mounted upon the forward end of said vehicle and adapted to gather a load as the vehicle is moved over a field and having a rigid upstanding member, and a load discharging device pivotally mounted upon the upstanding member of the rake, and means to automatically operate said discharging device to discharge the load from the rake as the rake is moved into discharging position.

6. In a hay gatherer and stacker, a vehicle having a frame provided with side members, supporting wheels applied at the front and rear of the frame, a rake pivotally mounted on the frame in advance of the front wheels and independently of the vehicle wheels, and means for adjusting said rake with relation to said vehicle to accumulate a load and to hold said load while being transported and to discharge the load when the rake is inclined downwardly, said vehicle adapted for use in connection with elevating mechanism onto which the vehicle may be run and having grooved rollers engaged by the side members by which said vehicle may be supported while the load is being discharged.

In testimony whereof I have hereunto set my hand this fifth day of March, A. D. 1918.

WILLIAM I. SONNER.

Witnesses:
  W. H. FINCKEL, Jr.,
  LILLIE M. KEELER.